United States Patent
Hahn et al.

(10) Patent No.: US 12,223,206 B2
(45) Date of Patent: Feb. 11, 2025

(54) DATA STORAGE DEVICE AND METHOD FOR DYNAMIC CONTROLLER MEMORY BUFFER ALLOCATION

(71) Applicant: Western Digital Technologies, Inc., San Jose, CA (US)

(72) Inventors: Judah Gamliel Hahn, Ofra (IL); Alexander Bazarsky, Holon (IL); Micha Yonin, Nes Tziona (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/223,144

(22) Filed: Jul. 18, 2023

(65) Prior Publication Data
US 2024/0231689 A1  Jul. 11, 2024

Related U.S. Application Data (60) Provisional application No. 63/437,171, filed on Jan. 5, 2023.

(51) Int. Cl.
*G06F 3/06* (2006.01)
(52) U.S. Cl.
CPC .......... *G06F 3/0659* (2013.01); *G06F 3/0626* (2013.01); *G06F 3/0656* (2013.01); *G06F 3/0679* (2013.01); *G06F 2213/0026* (2013.01)
(58) Field of Classification Search
None
See application file for complete search history.

(56) References Cited

U.S. PATENT DOCUMENTS

| | | | |
|---|---|---|---|
| 9,552,175 B2 | 1/2017 | Takefman et al. | |
| 10,452,278 B2 | 10/2019 | Benisty | |
| 10,489,082 B2 | 11/2019 | Benisty | |
| 10,725,835 B2 | 7/2020 | Benisty | |
| 2006/0015699 A1 | 1/2006 | Fujiwara et al. | |
| 2018/0225204 A1* | 8/2018 | Choudhari | G06F 12/0806 |
| 2018/0321962 A1* | 11/2018 | Peddamallu | G06F 12/16 |
| 2019/0294350 A1 | 9/2019 | Hahn et al. | |
| 2020/0004445 A1* | 1/2020 | Benisty | G06F 3/0664 |

(Continued)

FOREIGN PATENT DOCUMENTS

CN   111221476 A  *  6/2020  ......... G06F 12/0866

OTHER PUBLICATIONS

Translation of CN-111221476-A. 2024.*
NVM Express® Base Specification, Revision 2.0b; NVM Express; Jan. 6, 2022; 455 pages.

*Primary Examiner* — Nathan Sadler
(74) *Attorney, Agent, or Firm* — Crowell & Moring LLP (57) ABSTRACT

A data storage device and method for dynamic controller memory buffer allocation are disclosed. In one embodiment, a data storage device is provided comprising a memory and a controller with a controller memory buffer. The controller is configured to communicate with the non-volatile memory and is further configured to configure a size of the controller memory buffer; receive a request from the host to modify the size of the controller memory buffer during operation of the data storage device; and determine whether to grant the request to modify the size of the controller memory buffer. Other embodiments are possible, and each of the embodiments can be used alone or together in combination.

18 Claims, 7 Drawing Sheets

(56) References Cited

U.S. PATENT DOCUMENTS

| | | |
|---|---|---|
| 2020/0089427 A1 | 3/2020 | Lee et al. |
| 2021/0200689 A1 | 7/2021 | Benisty et al. |
| 2021/0382780 A1* | 12/2021 | Muthiah ............ G06F 11/0757 |
| 2022/0035738 A1 | 2/2022 | Brandt |
| 2022/0269434 A1 | 8/2022 | Shin |

* cited by examiner

DATA STORAGE DEVICE AND METHOD FOR DYNAMIC CONTROLLER MEMORY BUFFER ALLOCATION

CROSS-REFERENCE TO RELATED APPLICATION

This application claims priority to U.S. provisional patent application No. 63/437,171, filed Jan. 5, 2023, which is hereby incorporated by reference.

BACKGROUND

A host can store data in and read data from a memory in a data storage device. The data storage device can contain a controller that facilitates read and write operations to the memory. The controller can contain a volatile memory referred to as a controller memory buffer. The size of the controller memory buffer is set by the data storage device during boot-up and is constant during the operation of the data storage device.

DETAILED DESCRIPTION

Overview

By way of introduction, the below embodiments relate to a data storage device and method for dynamic controller memory buffer allocation. In one embodiment, a data storage device is provided comprising a non-volatile memory and a controller comprising a controller memory buffer. The controller is configured to communicate with the non-volatile memory and is further configured to configure a size of the controller memory buffer; receive a request from the host to modify the size of the controller memory buffer during operation of the data storage device; and determine whether to grant the request to modify the size of the controller memory buffer.

In some embodiments, the controller is further configured to use excess space in the controller memory buffer not being used by the host.

In some embodiments, the controller is further configured to consider workload in determining whether to grant the request.

In some embodiments, the request comprises a dedicated command.

In some embodiments, the controller and host each comprise respective controller memory buffer allocation modules.

In some embodiments, the controller is further configured to deny the request in response to the request seeking to enlarge a size of the controller memory buffer beyond its maximum size.

In some embodiments, the controller is further configured to evict data in the controller memory buffer in order to grant the request.

In some embodiments, the controller is further configured to prioritize data in the controller memory buffer for eviction.

In some embodiments, the controller is further configured to send a confirmation to the host after granting the request.

In some embodiments, the non-volatile memory comprises a three-dimensional memory.

In another embodiment, a method is provided that is performed in a host in communication with a data storage device comprising a controller with a controller memory buffer. The method comprises: instructing the data storage device to configure a size of the controller memory buffer; receiving a request from the data storage device to modify the size of the controller memory buffer; and determining whether to grant the request from the data storage device to modify the size of the controller memory buffer.

In some embodiments, the data storage device is configured to use excess space in the controller memory buffer not being used by the host.

In some embodiments, workload is considered in determining whether to grant the request.

In some embodiments, the request comprises a dedicated command.

In some embodiments, the controller and host each comprise respective controller memory buffer allocation modules.

In some embodiments, the method further comprises determining to deny the request in response to the request seeking to enlarge a size of the controller memory buffer beyond its maximum size.

In some embodiments, the method further comprises causing data to be evicted from the controller memory buffer in order to grant the request.

In some embodiments, the method further comprises causing prioritization of data for eviction.

In some embodiments, the method further comprises sending a confirmation to the data storage device after granting the request.

In another embodiment, a data storage device is provided comprising: a non-volatile memory; a controller configured to communicate with the non-volatile memory and comprising a controller memory buffer; and means for changing a size of the controller memory buffer from an initial size to a modified size during operation of the data storage device.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
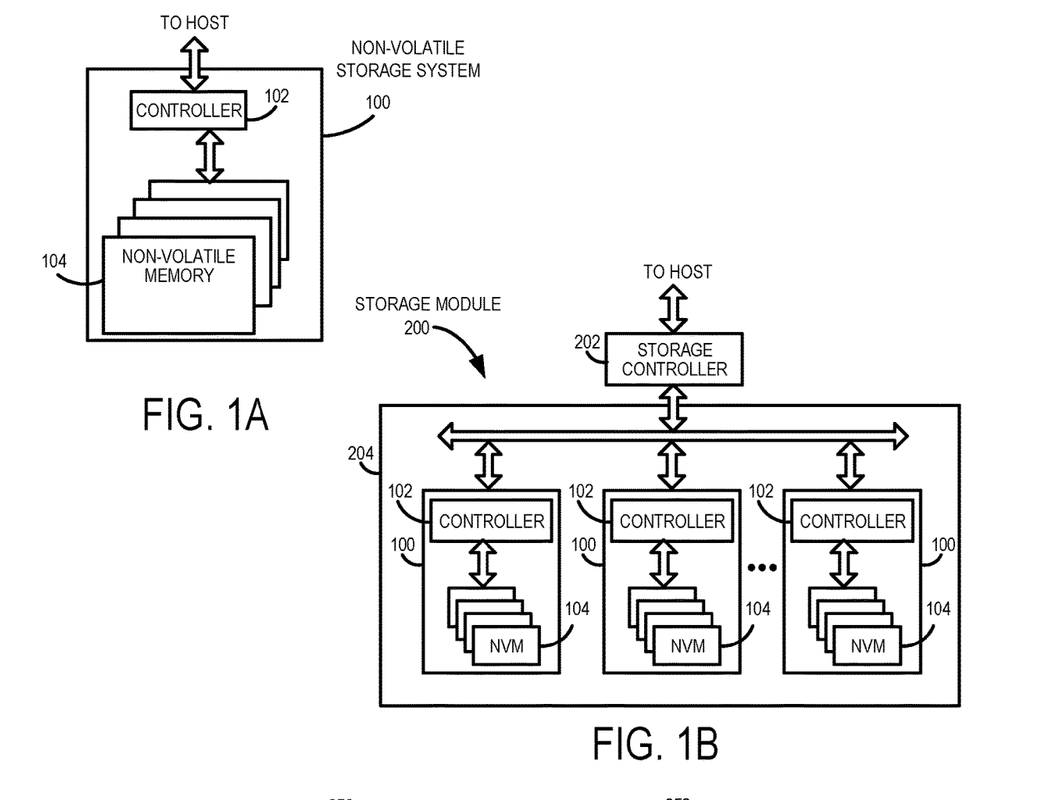
FIG. 1A is a block diagram of a data storage device of an embodiment.
FIG. 1B is a block diagram illustrating a storage module of an embodiment.
Figure 1C:
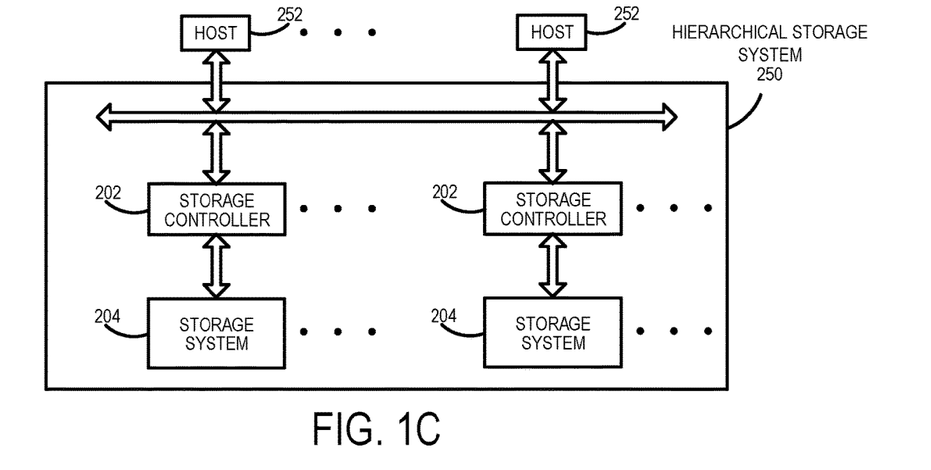
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a solid-state drive. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
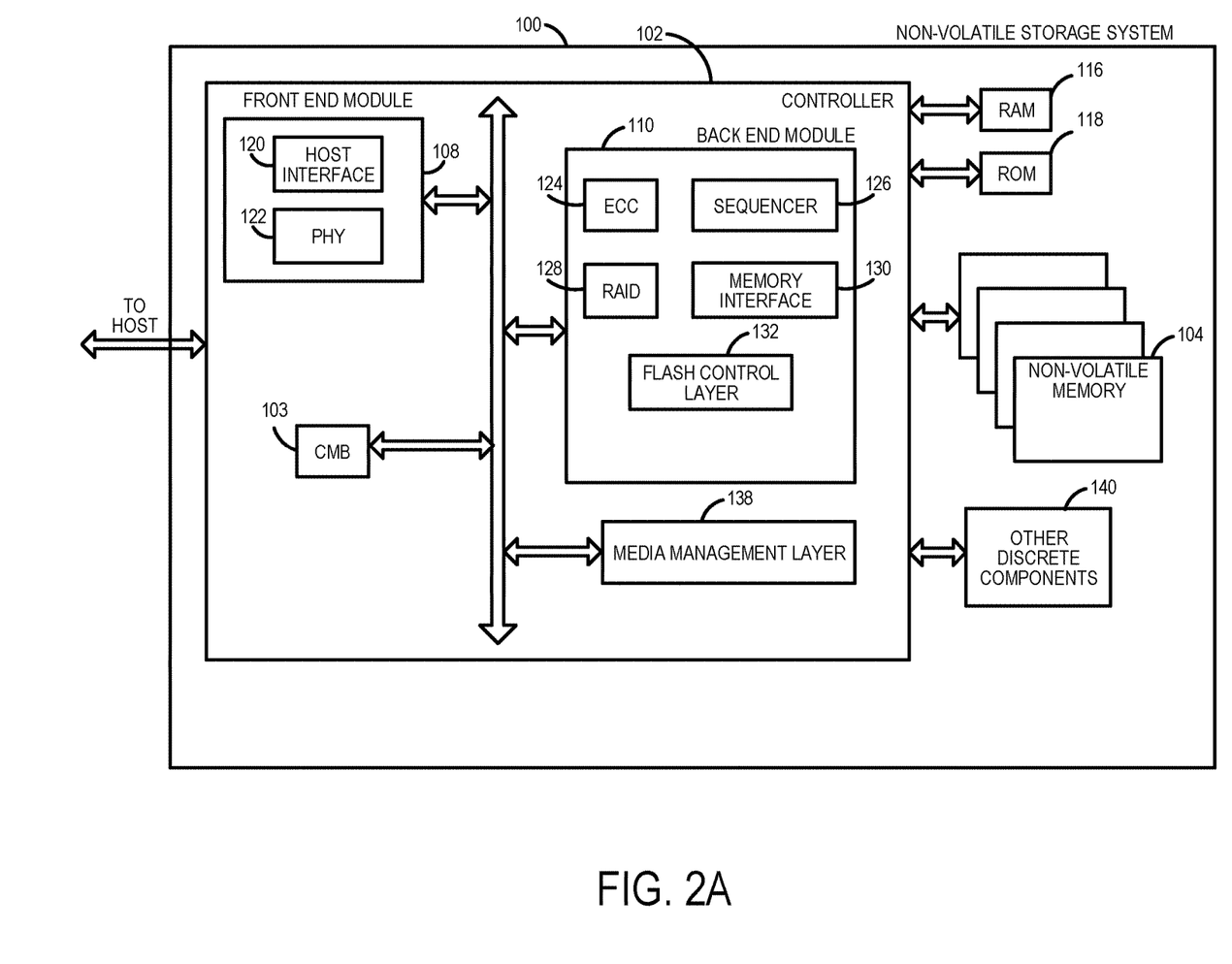
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
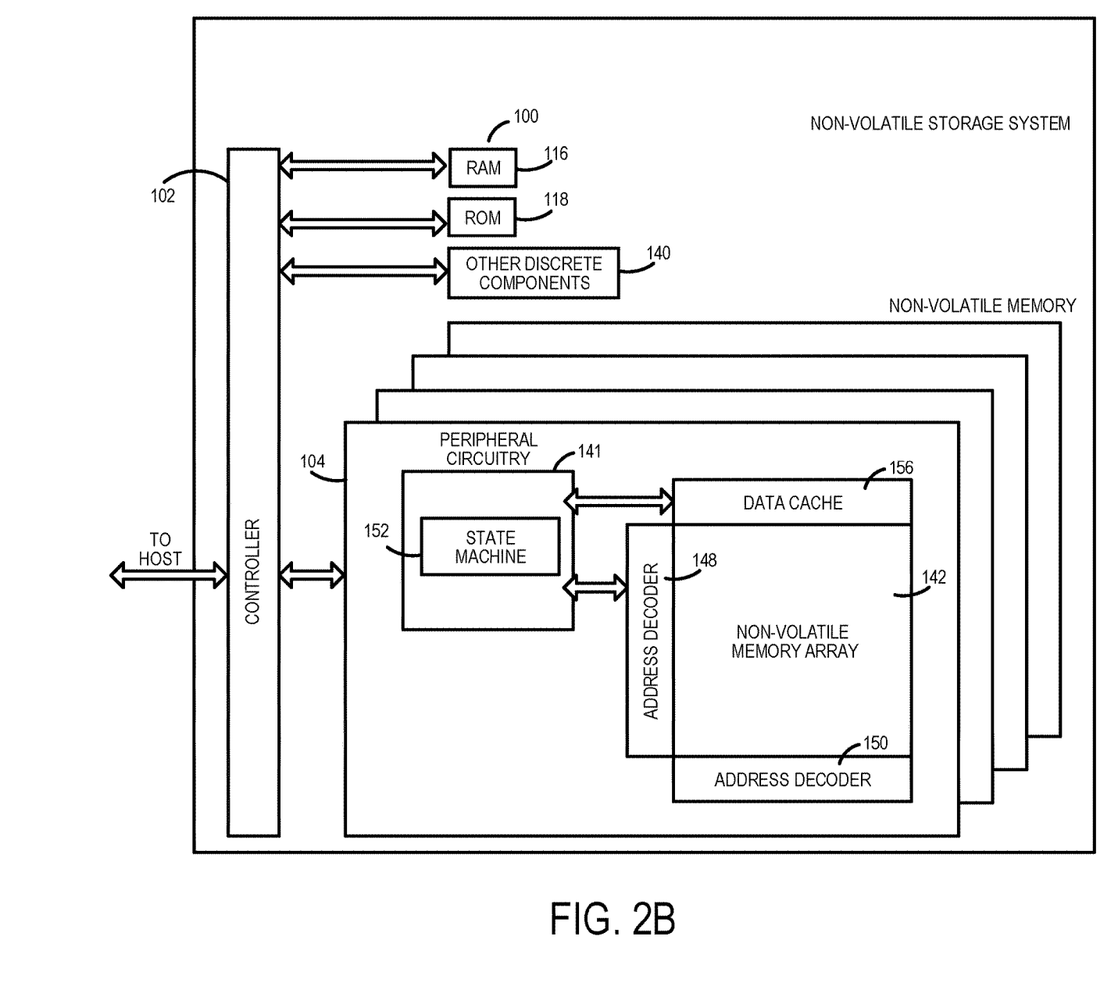
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and row and address decoders 148, 150. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
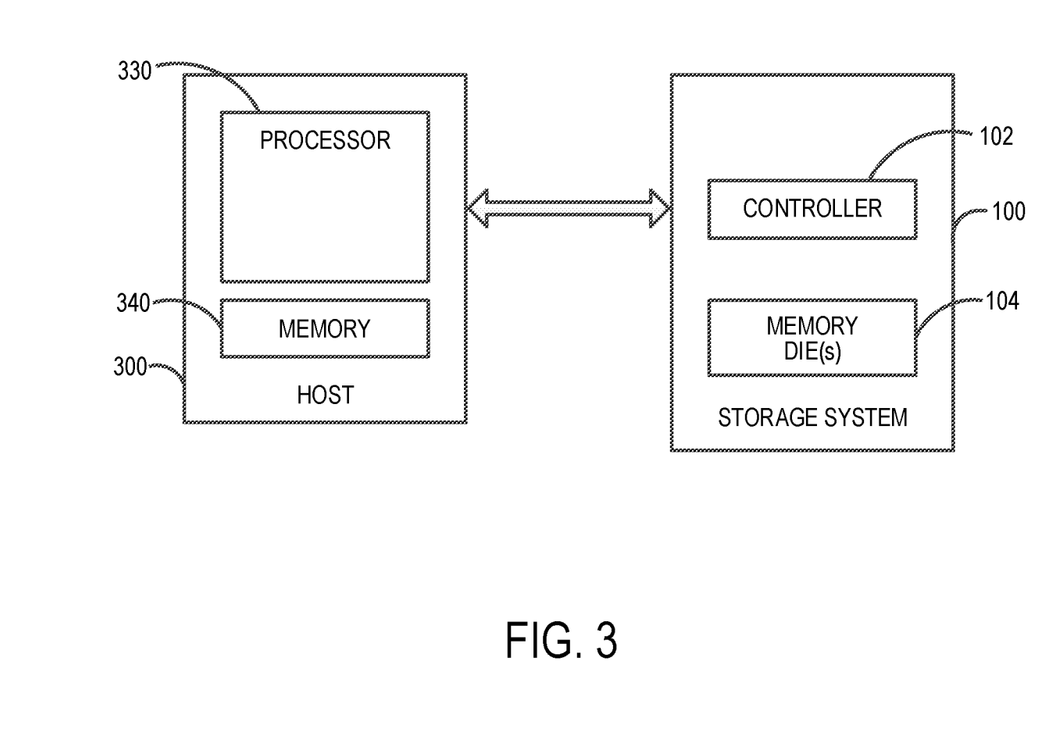
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Referring back to FIG. 2A, the controller 102 in this embodiment also comprises a volatile memory (e.g., DRAM), which is referred to herein as a controller memory buffer (CMB) 103. In one embodiment, the CMB 103 is a general-purpose read/write memory that can be used for any suitable purpose by the data storage device 100 and/or by the host 300, such as, but not limited to, caching a portion of a logical-to-physical address map stored in the non-volatile memory 104, storing submission and/or completion queues, storing control or other data, etc.

The following paragraphs provide details of an implementation of the CMB 103 under the NVMe specification. It should be understood that these details are being provided merely as an example and that the details discussed herein (related to the NVMe specification or otherwise) should not be read into the claims unless expressly recited therein.

In one embodiment, the controller 102 indicates support for the CMB 103 by setting CAP.CMBS to '1.' Once this bit is set to '1', the controller 102 indicates the properties of the CMB 103 via the CMBLOC and CMBSZ properties. The host 300 indicates intent to use the CMB 102 by setting CMBMSC.CRE to '1'. As mentioned above, the CMB 103 may be used for a variety of purposes, and the controller 102 can indicate which purposes the CMB 103 may be used by setting support flags in the CMBSZ property. The CMB's PCI Express address range can be used for external memory read and write requests to the CMB 103. The PCI Express base address of the CMB 103 can be defined by the PCI Base Address Register (BAR) indicated by CMBLOC.BIR, and the offset can be indicated by CMBLOC.OFST. The size of the CMB 103 can be indicated by CMBSZ.SZ. The controller 102 can use the CMB's controller address range to reference the CMB 103 with addresses supplied by the host 300. The PCI Express address range and the controller address range of the CMB 103 may differ, but both ranges can have the same size, and equivalent offsets within each range can have a one-to-one correspondence.

The host 300 can configure the controller address range via the CMBMSC property. The host 300 can enable the CMB's controller memory space via the CMBMSC.CMSE bit. When controller memory space is enabled, if the host 300 supplies an address referencing the CMB's controller address range, the controller 102 can direct memory read or write requests for this address to the CMB 103. The CMB 103 may be used by the host 300 to store submission queues so that the controller 102 can read the addresses directly from the CMB 103 when the read command is issued. Completion queues in the CMB 103 may be used for peer to peer or other applications. For writes of small amounts of data, it may be advantageous to have the host 300 write the data and/or metadata to the CMB 103 rather than have the controller 102 fetch it from host memory 340.

The controller 102 may support Physical Region Pages (PRPs) and Scatter Gather Lists (SGLs) in the CMB 103. If the CMBLOC.CDPMLS bit is cleared to '0,' then for a particular PRP List or SGL associated with a single command, all memory associated with the PRP List or SGL can be either entirely located in the CMB 103 or entirely located outside the CMB 103. The controller 102 may support data and metadata in the CMB 103. If the CMBLOC.CDMMMS bit is cleared to '0', then all data and metadata, if any, associated with a particular command can be either entirely located in the CMB 103 or entirely located outside the CMB 103. The address region allocated for the CMB 103 can be 4 KiB aligned. The controller 102 can allocate the CMB 103 on an 8-KiB boundary. The controller 102 can support burst transactions up to the maximum payload size, support byte enables, and arbitrary byte alignment.

The size of the CMB 103 can be indicated by the CMBSZ.SZ field from the NVMe specification. This configuration is set during the boot by the data storage device 100. The size of the CMB 103 is constant during the operation of the data storage device 100, and the space that is dedicated for the CMB 103 can remain empty if the host 300 does not utilize it.

The following embodiments can be used to modify the size of the CMB 103 during the operation of the data storage device 100. These embodiments can improve the flexibility of the CMB implementation and the utilization of DRAM, resulting in faster high-end storage controller operation. In one embodiment, the host 300 can modify the CMB size according to its current needs and conditions, and the data storage device 100 can use the excess space in the CMB 103 when the host 300 does not need it (and co-ordinate the operation with the host 300 to better utilize the controller RAM). In one embodiment, a modified interface between the host 300 and the data storage device 100 can be used, and the host 300 can use a dedicated command that indicates the CMB size it needs for its operations (e.g., larger or smaller than the currently-used CMB size). With reference to the embodiment shown in FIG. 4, the host 50 can have a host CMB allocation module 55, and the controller 102 in the data storage device 100 can have a CMB 400 and a storage controller CMB allocation module 455. The storage controller CMB allocation module 455, which can be computer-readable program code executed in a processor in the controller 102, can control the CMB size (e.g., to dynamically change the host-controlled addresses) according to a host command or another triggering event. The host CMB allocation module SS, which can be computer-readable program code executed by the processor in the host 50, can issue and receive commands related to the CMB size modification.

Figure 4:
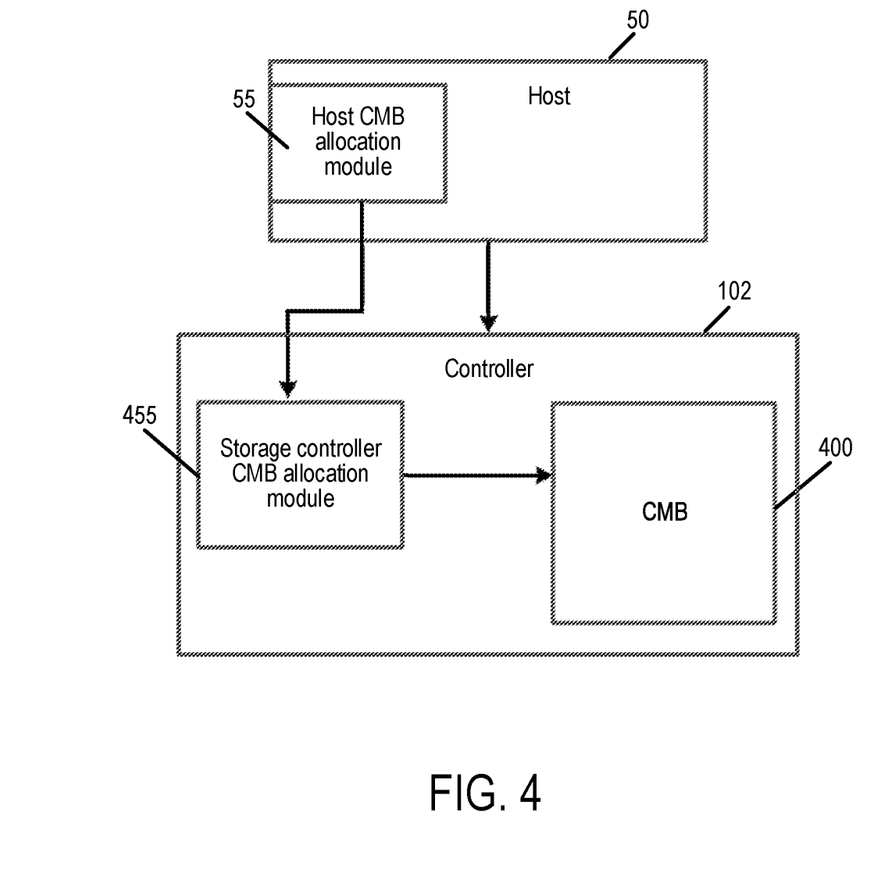
FIG. 4 is a block diagram of a host and a controller of an embodiment.

The allocation modules 55, 455 can consider the current workload in order to change the CMB size according to the expected load. For example, in a low-intensity workload with data of short length, the data storage device 100 may decide to use the CMB 103 for storing user data, as it is relatively small and the associated overhead would not be significant. In a high-intensity, long sequential workload, the CMB transfer and fetch can have an additional unnecessary overhead that the host 300 can avoid, while the host 300 can use the CMB 103 for its own purposes.

Figure 5:
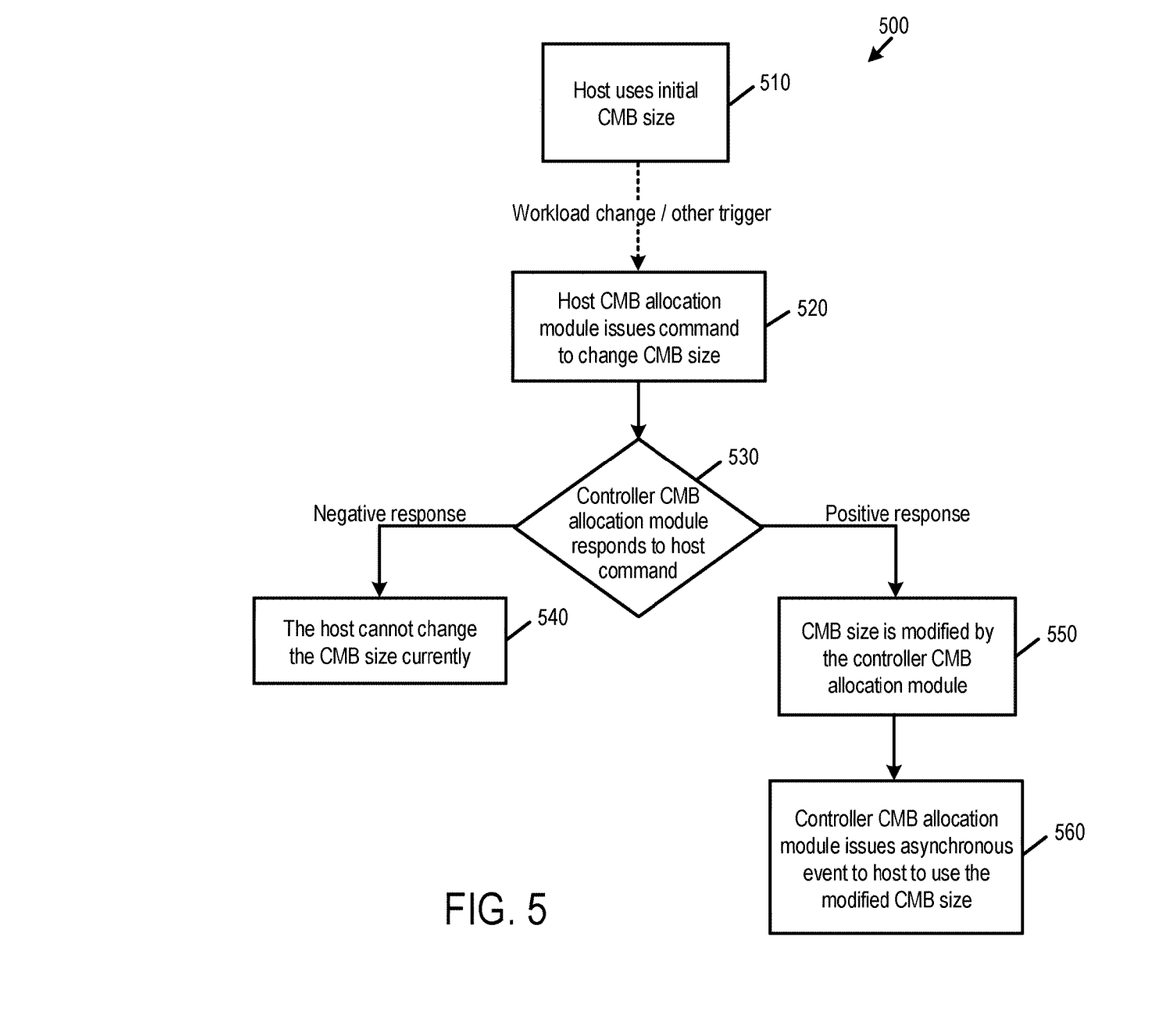
FIG. 5 is a flow chart of a method of an embodiment for dynamic controller memory buffer allocation by a host.

FIG. 5 is a flow chart 500 of a method of an embodiment for dynamic controller memory buffer allocation by the host 300. As shown in FIG. 5, first, the host 300 sets some initial CMB size (and/or purpose) (act 510). Then, after some workload change or other trigger (e.g., an environment change, change in workload locality, power instability, bit error rate (BER) elevation etc.), the host CMB allocation module 55 issues a command to change the CMB size (and/or purpose) (act 520). The controller CMB allocation module 455 then analyzes the current CMB usage and responds to the host 300—either confirming or denying the request (act 530). For example, if the host 300 is asking to enlarge the CMB 103 beyond its maximum size, the controller CMB allocation module 455 can deny the request (act 540). However, if the controller CMB allocation module 455 is able to grant the request, the controller CMB allocation module 455 modifies the CMB size, as requested (act 550). This may include eviction of some of the controller data that currently resides in DRAM to free the space. The controller CMB allocation module 455 can prioritize which data can be evicted with minimal impact on the controller's performance. After freeing up the corresponding space requested by the host 300, the controller CMB allocation module 455 can return a confirmation note to the host 300 (act 560).

Figure 6:
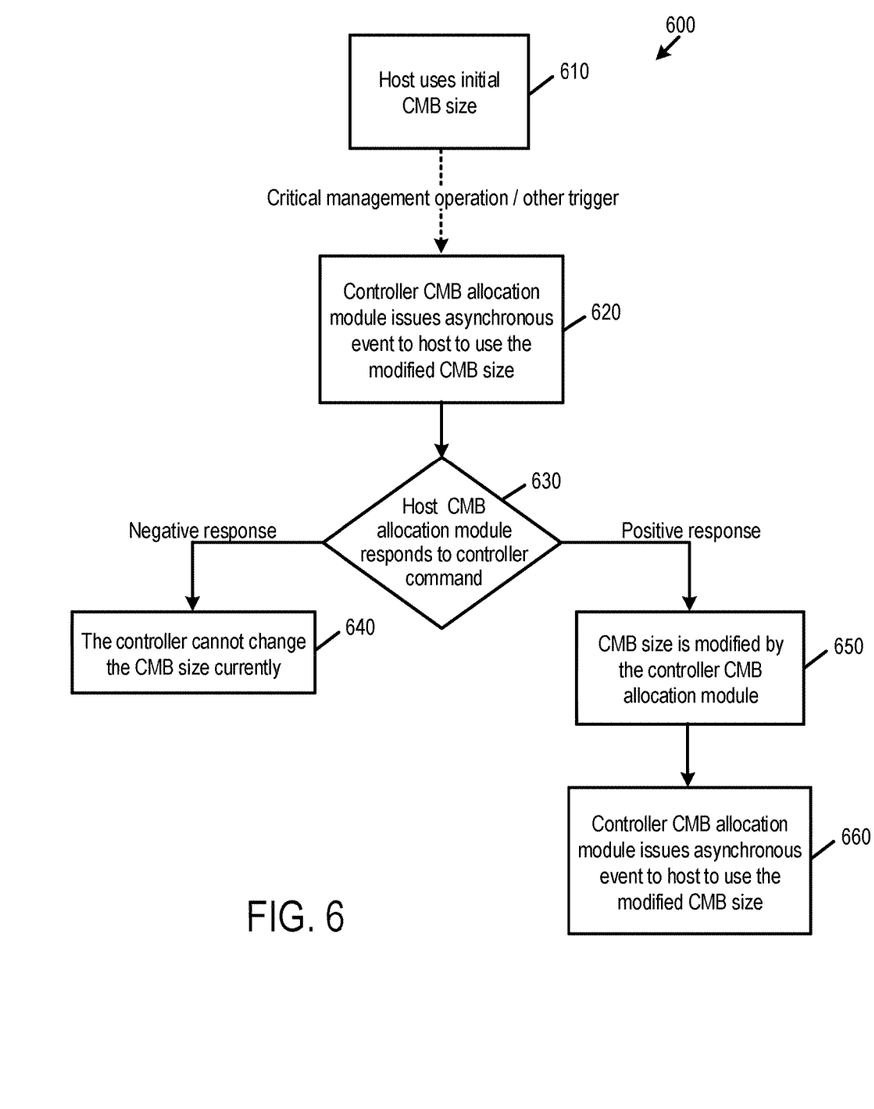
FIG. 6 is a flow chart of a method of an embodiment for dynamic controller memory buffer allocation by a data storage device.

FIG. 6 is a flow chart 600 of a method of an embodiment for dynamic controller memory buffer allocation by the data storage device 100. In this embodiment, the controller 102 may issue a request to modify the CMB size. The request may come in the form of an asynchronous event and may be triggered by a controller need to use the DRAM (such as some critical management operation, identification of an unusually low hit rate for controller metadata cached in DRAM, or identifying that the host 300 does not fully use the allocated space for a long period of time). As shown in FIG. 6, first, the host 300 sets some initial CMB size (and/or purpose) (act 610). Then, after a critical management operation or other trigger, the controller CMB allocation module 455 issues an asynchronous event to the host 300 to change the CMB size (act 620). The host CMB allocation module 55 then responds to the controller command (act 630). For example, if the controller 102 is asking to enlarge the CMB 103 beyond its maximum size, the host CMB allocation module 55 can deny the request (act 640). However, if the host CMB allocation module 55 is able to grant the request, the host CMB allocation module 55 modifies the CMB size, as requested (act 650). The controller CMB allocation module 455 then issues an asynchronous event to the host 300 to use the modified CMB size (act 660)

There are several advantages associated with these embodiments. For example, when the CMB is used in certain NVMe data storage devices to support high-throughput use cases, these embodiments can be used to allow better integration of the CMB with those data storage devices. This can improve utilization of their CMB/DRAM and, as a result, reduce power consumption and improve performance in certain workloads.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method comprising:
    performing in a host in communication with a data storage device comprising a volatile memory and a controller memory buffer created from a portion of the volatile memory:
        storing host data in another portion of the volatile memory;
        receiving a request from the data storage device to increase a size of the controller memory buffer;
        determining whether to grant the request; and
        in response to determining to grant the request, increasing the size of the controller memory buffer by evicting at least some of the host data from the another portion of the volatile memory to free space in the volatile memory.

2. The method of claim 1, wherein the data storage device is configured to use excess space in the controller memory buffer not being used by the host.

3. The method of claim 1, wherein workload is considered in determining whether to grant the request.

4. The method of claim 1, wherein the request comprises a dedicated command.

5. The method of claim 1, wherein the data storage device and the host each comprise respective controller memory buffer allocation modules.

6. The method of claim 1, further comprising determining to deny the request in response to the request seeking to enlarge a size of the controller memory buffer beyond its maximum size.

7. The method of claim 1, further comprising causing prioritization of data for eviction.

8. The method of claim 1, further comprising sending a confirmation to the data storage device after granting the request.

9. A data storage device comprising:
    a non-volatile memory;
    a volatile memory; and
    means for:
        configuring a size of a controller memory buffer created from a portion of the volatile memory, wherein the controller memory buffer is configured for use by a host;
        storing controller data in another portion of the volatile memory;
        receiving a request from the host to increase the size of the controller memory buffer during operation of the data storage device;
        determining whether to grant the request; and
        in response to determining to grant the request, increasing the size of the controller memory buffer by evicting at least some of the controller data from the another portion of the volatile memory to free space in the volatile memory.

10. A data storage device comprising:
    a non-volatile memory;
    a volatile memory; and
    a controller comprising a processor, wherein the processor is configured to communicate with the non-volatile memory and the volatile memory and is further configured to:
        configure a size of a controller memory buffer created from a portion of the volatile memory, wherein the controller memory buffer is configured for use by a host;
        store controller data in another portion of the volatile memory;
        receive a request from the host to increase the size of the controller memory buffer during operation of the data storage device;
        determine whether to grant the request; and
        in response to determining to grant the request, increase the size of the controller memory buffer by evicting at least some of the controller data from the another portion of the volatile memory to free space in the volatile memory.

11. The data storage device of claim 10, wherein the processor is further configured to use excess space in the controller memory buffer not being used by the host.

12. The data storage device of claim 10, wherein the processor is further configured to consider workload in determining whether to grant the request.

13. The data storage device of claim 10, wherein the request comprises a dedicated command.

14. The data storage device of claim 10, wherein the controller and host each comprise respective controller memory buffer allocation modules.

15. The data storage device of claim 10, wherein the processor is further configured to deny the request in response to the request seeking to enlarge a size of the controller memory buffer beyond its maximum size.

16. The data storage device of claim 1, wherein the processor is further configured to prioritize data in the controller memory buffer for eviction.

17. The data storage device of claim 10, wherein the processor is further configured to send a confirmation to the host after granting the request.

18. The data storage device of claim 10, wherein the non-volatile memory comprises a three-dimensional memory.

* * * * *